(12) United States Patent
Kim

(10) Patent No.: US 8,757,670 B2
(45) Date of Patent: Jun. 24, 2014

(54) PIPE CONNECTION CONSISTED ON INTERIOR OF A JOINT PIPE

(75) Inventor: Jong Hwan Kim, Gunpo-si (KR)

(73) Assignee: Lucky Tech Co., Ltd., Gunpo-si, Kyeonggi-do (KR)

(*) Notice: Subject to any disclaimer, the term of this patent is extended or adjusted under 35 U.S.C. 154(b) by 396 days.

(21) Appl. No.: 13/274,531

(22) Filed: Oct. 17, 2011

(65) Prior Publication Data

US 2012/0091706 A1    Apr. 19, 2012

(30) Foreign Application Priority Data

Oct. 15, 2010    (KR) .......................... 10-2010-0101049

(51) Int. Cl.
F16L 21/06    (2006.01)

(52) U.S. Cl.
USPC ............... 285/322; 285/33; 285/39; 285/317; 285/319

(58) Field of Classification Search
USPC ........... 285/39, 322–324, 319, 340, 316, 244, 285/317, 104, 6, 33–35, 257, 321; 277/618, 277/342, 603, 609, 616, 621, 630, 637
See application file for complete search history.

(56) References Cited

U.S. PATENT DOCUMENTS

| | | | | |
|---|---|---|---|---|
| 3,061,337 A | * | 10/1962 | Shaw et al. ................. | 285/121.4 |
| 5,725,257 A | * | 3/1998 | Sakane et al. ................. | 285/81 |
| 6,808,211 B2 | * | 10/2004 | Hofmann et al. ............. | 285/305 |
| 6,893,051 B1 | * | 5/2005 | Park et al. ..................... | 285/104 |
| 2009/0140520 A1 | * | 6/2009 | Krausz et al. ................. | 285/340 |

* cited by examiner

Primary Examiner — James Hewitt
Assistant Examiner — Jay R Ripley
(74) Attorney, Agent, or Firm — Novick, Kim & Lee, PLLC; Jae Youn Kim

(57) ABSTRACT

A pipe connector constructed in the interior of a joint pipe. In the pipe connector, an O-ring made of a flexible rubber, a stop ring which is in tight contact with and supports the outer circumference of the pipe inserted into the joint pipe, and an elastic stopper are installed in sequence such that the pipe connector can be pressed and fixed to the outer circumference of the pipe, which is inserted into and connected to the joint pipe, in order to provide air tightness and water tightness to the pipe. Consequently, the pipe is inserted into the joint pipe with one touch without being detached or dislodged, is coupled such that water tightness can be maintained, and is separated by pressure in the direction in which the pipe proceeds.

6 Claims, 4 Drawing Sheets

PIPE CONNECTION CONSISTED ON INTERIOR OF A JOINT PIPE

BACKGROUND OF THE INVENTION

1. Field of the Invention

The present invention relates to a pipe connector constructed in the interior of a joint pipe. More particularly, the pipe connector that can contain a pipe therein is constructed in the interior of a joint pipe into which a pipe is inserted. In the pipe connector, an O-ring made of a flexible rubber, a stop ring which is in tight contact with and supports the outer circumference of the pipe inserted into the joint pipe, and an elastic stopper @are installed in sequence such that the pipe connector can be pressed and fixed to the outer circumference of the pipe, which is inserted into and connected to the joint pipe, in order to provide air tightness and water tightness to the pipe. Consequently, the pipe is inserted into the joint pipe with one touch without being detached or dislodged, is coupled such that water tightness can be maintained, and is separated by pressure in the direction in which the pipe proceeds.

2. Description of the Related Art

Piping work includes all work to cut multiple standard size pipes according to installation environment and to connect the resultant pieces together, thereby forming a pipeline. In doing such piping work, pipe connection devices are being used for extending pipe length and changing pipeline directions.

Pipes are mainly used for carrying water in the water or sewer system, oil or fluid in the hydraulic lines, gas, and other various raw materials such as powder.

As such pipes are normally produced in standard sizes, when the total length of the transport line is relatively long, it should have multiple connecting points, which are to be structured to sustain air tightness in order to prevent a leakage.

However, as the previous ordinary pipe connecting devices need the rotation of a pipe for insertion, it is very difficult to provide air tightness and good workability.

In addition, when a connected pipe is replaced, disconnection of the pipe is not easy and takes a lot of working time.

In particular, when connecting soft pipes, the connecting area tends to be plastically deformed to let the connecting area loose. Welding performed to connect pipes may cause a fire. Thus, to form a delicate and stable piping structure has become a challenge.

BRIEF SUMMARY OF THE INVENTION

To resolve the foregoing problems with the related art, an object of the present invention is to construct a pipe connector in the interior of a joint pipe. More particularly, the pipe connector that can contain a pipe therein is constructed in the interior of a joint pipe into which a pipe is inserted. In the pipe connector, an O-ring made of a flexible rubber, a stop ring which is in tight contact with and supports the outer circumference of the pipe inserted into the joint pipe, and an elastic stopper are installed in sequence such that the pipe connector can be pressed and fixed to the outer circumference of the pipe, which is inserted into and connected to the joint pipe, in order to provide air tightness and water tightness to the pipe. Consequently, the pipe is inserted into the joint pipe with one touch without being detached or dislodged, is coupled such that water tightness can be maintained, and is separated by pressure in the direction in which the pipe proceeds.

An aspect of the present invention provides a pipe connector that includes: a joint pipe having a hollow round shape, with an opening formed in one or either side, an O-ring contained in the joint pipe, the O-ring being coupled to an outer circumference of one end of the pipe to provide water tightness, a stop ring in contact with and pressing an outer circumference of the pipe, the stop ring having multiple pressing pieces that are arranged radially and have an inward incline in order to prevent the pipe from moving by pressing the outer circumference of the pipe, a stopper interposed between stop ring and O-ring, the stopper including a spring having a predetermined amount of elasticity such that the spring applies a force to the stop ring to force the pressing pieces into the inserted pipe, a push socket partially contained in the stop ring, the push socket being elastically pressed by the stop ring, the O-ring being pressed to the outer circumference of one end of the pipe and being in contact with an inner circumference of the joint pipe, thereby providing water tightness between the pipe and the joint pipe.

The O-ring may be pressed to the outer circumference of one end of the pipe such that is one end of the pipe in tight contact with the inner circumference of the joint pipe, thereby providing water tightness between the pipe and the joint pipe.

The stop ring may hold the pipe so that the pipe does not move in a direction reverse to a direction in which the pipe proceeds.

The stop ring may prevent the detachment of the pipe. Multiple pressing pieces may be bent with an inward incline, thereby coming into tight contact with and pressing the outer circumference of the pipe.

The stop ring may have a round ring-like shape, with the multiple pressing pieces being integrated thereto.

The stopper may further include spring guides on both sides of the spring, which is interposed between the spring guides.

The pressing pieces of the above stop ring may have a saw tooth-like shape, with multiple lugs protruding therefrom.

Each of the pressing pieces of the above stop ring may be implemented as a V-shaped cone, with a width thereof increasing from top to bottom.

Each of the pressing pieces of the above stop ring may have a quadrangular shape, with a width thereof increasing from top to bottom. The pressing piece has multiple cut lines extending horizontally.

The stop ring may be made of a hardened metal material and not be affected by the introduction and mixture of minute foreign materials when the soundings are open.

Furthermore, the outer shape of the joint pipe may be I, L, or T.

In embodiments of the present invention, in the pipe connector, the O-ring made of a flexible rubber, the stop ring which is in tight contact with and supports the outer circumference of the pipe inserted into the joint pipe, and the elastic stopper are installed in sequence in order to provide air tightness and water tightness to the pipe, which is in tight contact with the interior of the joint pipe. This consequently achieves the effects of maintaining the pipe in the watertight state inside the joint pipe while preventing the inserted pipe from moving.

In addition, the pipe can be easily coupled to or disassembled from the joint pipe, thereby improving operability and workability. Furthermore, it is possible to maintain the coupled state more stably.

DETAILED DESCRIPTION OF THE INVENTION

Figure 1:
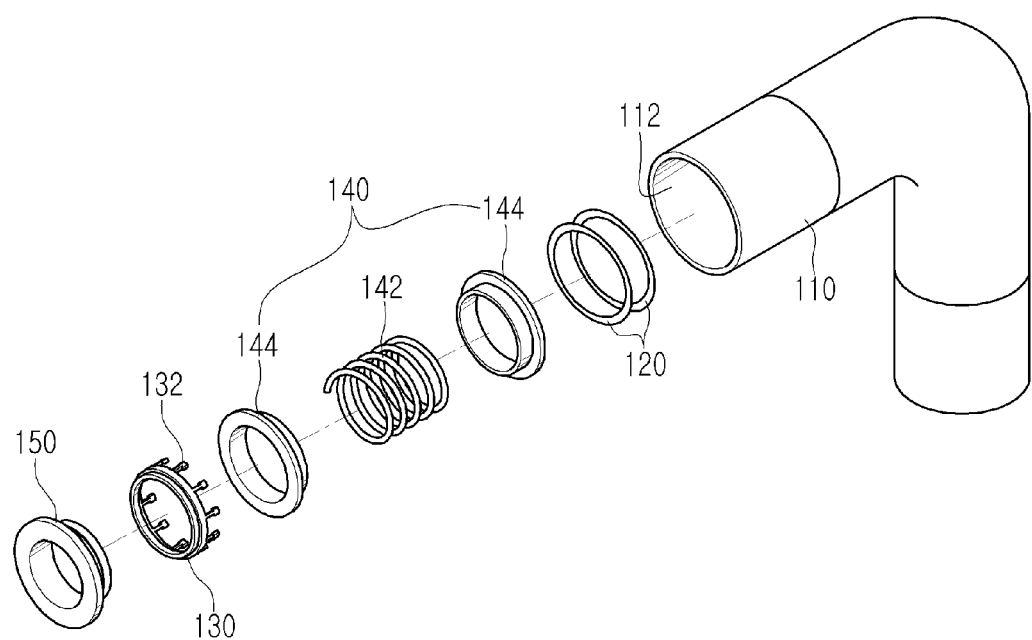
FIG. 1 is a disassembled perspective view of a pipe connector according to an embodiment of the present invention.

The purpose of the present invention has been achieved by providing a pipe connector constructed in the interior of a joint pipe. The pipe connector includes a joint pipe having a hollow round shape, with an opening formed in one or either side, an O-ring contained in the joint pipe, the O-ring being coupled to an outer circumference of one end of the pipe to provide water tightness, a stop ring in tight contact with and pressing an outer circumference of the pipe, the stop ring having multiple pressing pieces that are arranged radially and have an inward incline in order to prevent the pipe from moving by pressing the outer circumference of the pipe, a stopper interposed between stop ring and O-ring, the stopper including a spring having a predetermined amount of elasticity such that the spring applies a force to the stop ring to force the pressing pieces into the inserted pipe, push socket partially contained in the stop ring, the push socket being elastically pressed by the stop ring, the O-ring being pressed to the outer circumference of one end of the pipe and being in contact with an inner circumference of the joint pipe, thereby providing water tightness between the pipe and the joint pipe.

The present invention will now be described more fully hereinafter with reference to the accompanying drawings, in which exemplary embodiments thereof are shown.

In the meantime, terms and words used in this description and claims should not be interpreted as ordinary or dictionary meanings, but as meanings and concepts conforming to the technical spirit of the present invention based on the principle that the inventor may properly define the concept of the terms in his own discretion to explain his invention in the best way.

As the embodiment explained in this description and the construction shown in the drawings only suggest one most preferred embodiment and do not present all technical spirits of the present invention, it must be understood that diverse equivalences and modifications may also be made in order to replace such an embodiment when the present invention is filed.

FIG. 1 is a disassembled perspective view of a pipe connector according an embodiment of the present invention.

As shown in the figure, the pipe connector of this embodiment is implemented as a pipe connector that allows a pipe (10, see FIG. 2) to be inserted into a joint pipe 110, and is pressed and fixed to the outer surface of the pipe 10, which is inserted into and connected to the joint pipe 110 and is in a horizontal position. To provide air tightness and water tightness of the pipe 10, which is tightly adhered to the interior of the joint pipe 110, O-rings 120 made of a flexible rubber, a stop ring 130, which is in tight contact with and fixedly supports the outer diameter of the pipe 10, and a stopper 140, which provides an elastic force, are installed in sequence in the pipe connector. When the pipe 10 is inserted into the joint pipe 110 with one touch, the pipe connector is assembled to the pipe 10 such that it prevents the pipe 10 from being detached or dislodged while maintains water tightness. The pipe 10 is separated by pressure along the direction in which the pipe 10 extends.

Figure 2:
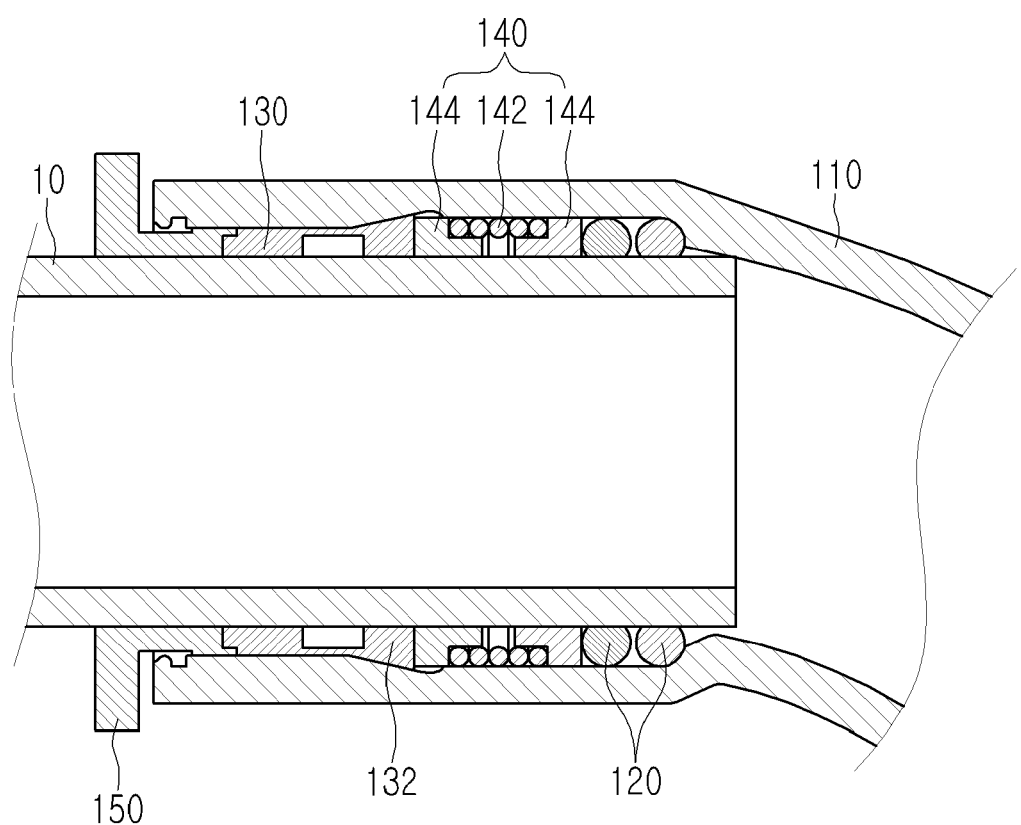
FIG. 2 is a cross-sectional view of the pipe connector according to an embodiment of the present invention.

As shown in the FIG. 2, the pipe connector basically includes a joint pipe 110, O-rings 120, a stop ring 130, a stopper 140, and a push socket 150.

In addition, the pipe connector is constructed inside the joint pipe 110, and is used for the connection between the joint pipe 110 and the pipe 10.

The joint pipe 110 has a bent shape with a round in the corner. The connection of horizontal pipes to both ends of the joint pipe sustains the sealed state.

The joint pipe 110 is round and hollow, with an opening(s) 112 being formed in one or both sides thereof.

In addition, a pipe connector(s) is constructed in one or both sides of the joint pipe 110.

One end of the pipe 10, which is inserted into one side of the joint pipe 110, is coupled with the pipe connector, and is fixedly introduced into the opening 112.

The pipe connector is coupled with the inserted pipe 10, which is inserted thereinto, and helps sustain water tightness inside the joint pipe 110.

The pipe connector sustains water tightness as a result of the coupling of the O-rings 120 with the outer circumference of one end of the joint pipe 110.

As the O-rings 110 are pressed against the outer circumference of one end of the pipe 10, they allow one end of the pipe 10 to stay in tight contact with the inner side of the joint pipe 10, and provide water tightness between the pipe 10 and the joint pipe 110.

The pipe 10 pushed by the O-rings 120 is inserted into the joint pipe 110 such that one end of the pipe 10 is inserted into the inside of the O-rings 120, and the pipe 10 is anchored by the stop ring 130 so that it is not dislodged. At the same time, the O-rings 120 help sustain water tightness as they are in tight contact with the pipe 10 due to compression power applied from the pipe 10.

The top ring 130 presses the outer circumference of the pipe 10, which is inserted into the interior of the above joint pipe 110, thereby preventing the pipe 10 from moving.

The stop ring 130 is of a round shape to house the pipe 10 therein, and is fixed by multiple pressing pieces 132, which are radially arranged.

The stop ring 130 is made of a hardened metal material.

The stop ring 130 is of a bent structure, with the pressing pieces 132 having an inward incline.

In the stopper ring 130, the multiple pressing pieces continuously protrude along a circle.

The stop ring 130 holds the pipe 10 in the joint pipe 110 so that the joint pipe 110 does not move in a direction reverse to the direction in which it proceeds.

The stop ring 13 is provided to prevent the pipe 10 from being detached. The multiple pressing pieces 132 are bent with an inward incline in order to press the outer circumference of the pipe so that the pipe 10 can be tightly fixed.

Figure 3:
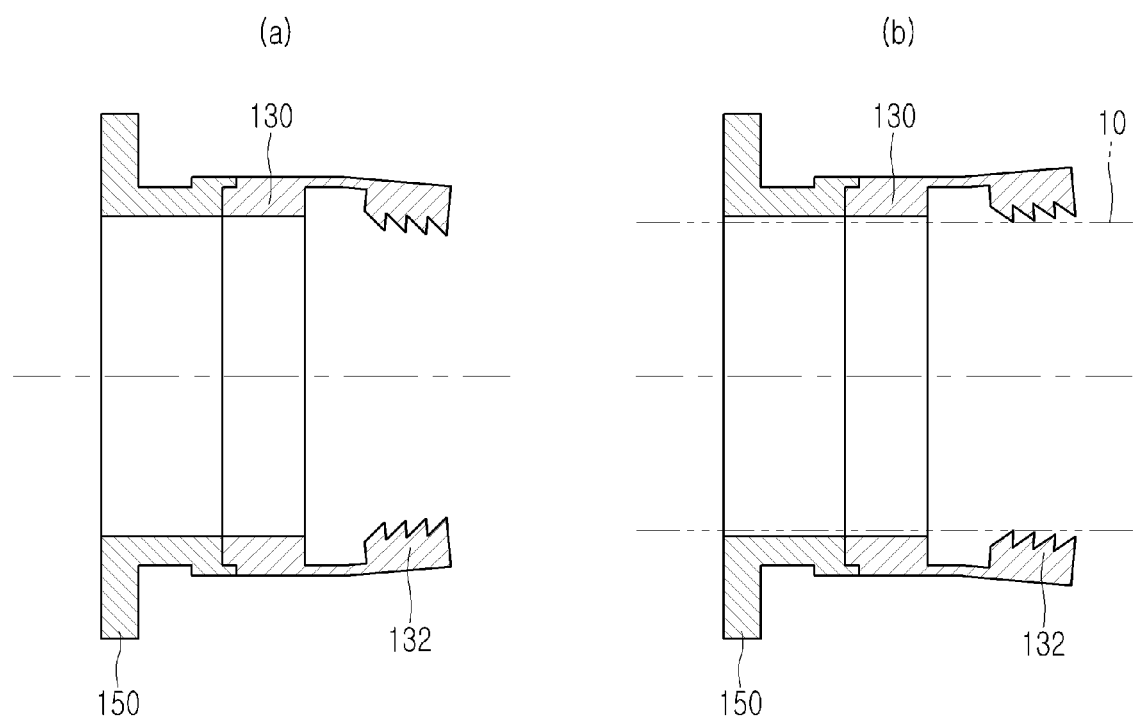
FIG. 3 is a sectional view of the stop ring of the pipe connector according to an embodiment of the present invention.

As shown in FIG. 3, the stop ring 130 is of a round ring type, with the multiple pressing pieces 132 being integrated thereto.

The pressing pieces 132 of the stop ring 130 are in tight contact with the outer circumference of the pipe 10, thereby fixing the pipe 10 so that it is not disconnected.

Each pressing piece 132 is of a saw tooth type, with multiple lugs protruding therefrom.

Figure 4:
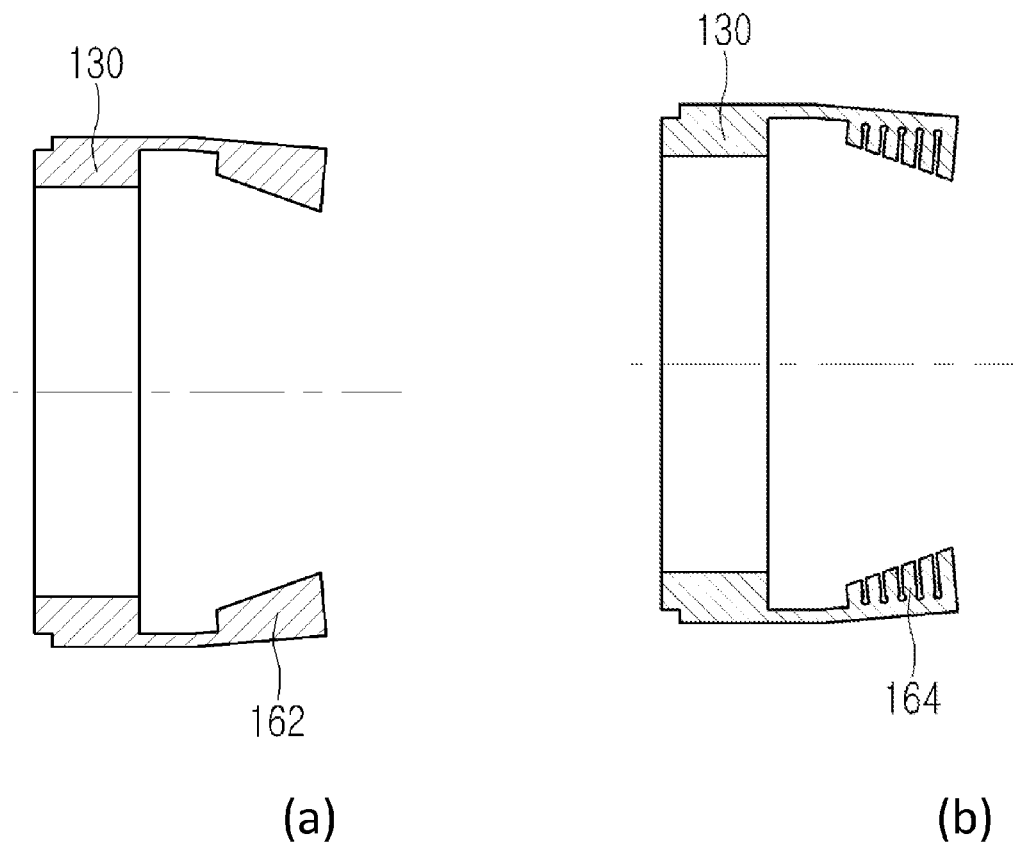
FIG. 4 is a cross-sectional view of an alternative of the stop ring for fixing a pipe in a pipe connector of the present invention.

As shown in FIG. 4, the pressing piece 132 may have various modified forms to fix the pipe 10. In an example, a pressing piece 162 of the stop ring 130 may be implemented in a V-shaped cone type, with the width thereof increasing from top to bottom.

In addition, the pressing piece 132 of the stop ring 130 may be modified into a quadrangular shape, with the width thereof increasing from top to bottom. This pressing piece may also have multiple horizontally-cut lines 164 in order to stably fix the pipe 10.

In this way, the pressing piece of the stop ring 130 may be implemented in a variety of shapes that has an inward incline so that the hooked state between the pipe 10 and the pressing piece 132 can be maintained.

In the meantime, the stopper 140 interposed between the stop ring 130 and the O-rings 120 provides a certain amount of elasticity to the pressing power that the pipe 10, which is inserted into the joint pipe 110, applies in the direction in which it proceeds.

The stopper 140 includes an elastic spring 142 and spring guides 144 on both sides of the elastic spring 142. The spring guides 144 fix the spring 142 by containing part of the spring 142 therein.

A portion of the push socket 150, which is installed in the opening 112 of the joint pipe 110, is contained inside the stop ring 130, and the push member 150 is elastically pressed by the stop ring 130.

When the pipe 10 is inserted into the joint pipe 110, the pipe 10 is introduced through the push socket 150. The pipe 10 is also fixed inside the joint pipe 110 by the pressing pieces 132 of the stop ring 130. When disconnecting the pipe 10, which is fixed inside the joint pipe, if it is pressed in the direction in which it proceeds, the stop ring 130, by which the push socket 150 is attached to the stopper 140, applies pressure in the proceeding direction. The pressing pieces 132 of the stop ring 130 are then deformed slightly inward from the saw tooth form into a tapered form, and become slightly loose from the state in which it is in close contact with the pipe 10.

At this time, the pipe 10 moves backward, and the stop ring 130 returns to its original position by the elasticity of the stopper 140.

In this way, the parts of the pipe connector, which fix the pipe 10, are sequentially installed in the interior of the joint pipe 110. The shape of the inner circumference of the above joint pipe 110 adjacent to of the opening is identical with the outer shape of the pipe connector such that the pipe connector can be set in position.

In the above-described construction, the pipe 10 is easy to be inserted but difficult to be detached due to the inclined pressing pieces 132 of the stop ring 130, so that the pipe 10 is stably connected and fixed to the joint pipe 110.

While the present invention has been described in the above examples and drawings, it should be understood that the present invention is not limited to such embodiments and that various alterations and modifications within the equivalency of the accompanying claims and the technical spirit of the present invention are apparent to a person having ordinary skill in the art to which the present invention pertains.

What is claimed is:

1. A pipe connector, comprising:
a joint pipe having a hollow round shape with an opening in one or either end;
a pipe inserted into the joint pipe;
an O-ring contained in the joint pipe, the O-ring being coupled to an outer circumference of one end of the pipe to provide water tightness;
a monolithic stop ring in contact with and pressing the outer circumference of the pipe, the stop ring having a plurality of cantilevered pressing pieces that are arranged radially and have an inward incline in order to prevent the pipe from moving by pressing the outer circumference of the pipe, wherein the stop ring is within the joint pipe;
a stopper interposed between the stop ring and the O-ring, the stopper including a spring having a predetermined amount of elasticity such that the spring applies a force to the stop ring to force the plurality of pressing pieces into the inserted pipe;
a push socket partially contained in the stop ring, the push socket being elastically pressed by the stop ring,
wherein the O-ring is pressed to the outer circumference of one end of the pipe and is in contact with an inner circumference of the joint pipe, thereby providing water tightness between the pipe and the joint pipe,
wherein the stop ring is a round-ring shape and the plurality of pressing pieces are integrated thereto,
wherein each of the plurality of pressing pieces has a cross-section defining a trapezoid shape,
wherein the trapezoid shape has a top leg, a first base, a bottom leg, and a second base in an order and the first base is in contact with an inner circumference of the stop ring, and the top leg is smaller than the bottom leg such that the second base defines the inward incline of each of the plurality of pressing pieces, and due to the inward incline, an inner diameter of the stop ring decreases along a direction that the pipe is inserted, and
wherein the inward incline is configured to be in contact with the pipe.

2. The pipe connector as claimed in claim 1, wherein the stop ring holds the pipe so that the pipe resists movement in a direction reverse to the direction in which the pipe is inserted.

3. The pipe connector as claimed in claim 1, wherein the stopper further includes spring guides on both sides of the spring such that the spring is interposed between the spring guides.

4. The pipe connector as claimed in claim 1, wherein each of the pressing pieces further comprises a plurality of protrusions extending from the inclined second base.

5. The pipe connector as claimed in claim 1, wherein each of the plurality of pressing pieces of the stop ring has a plurality of cut lines extending in a direction from the second base to the first base.

6. The pipe connector as claimed in claim 1, wherein the stop ring is made of a hardened metal material.

* * * * *